US010116600B2

(12) United States Patent
Smith

(10) Patent No.: US 10,116,600 B2
(45) Date of Patent: Oct. 30, 2018

(54) EXPRESSING STATEMENTS IN MESSAGES WITH PERSONALIZED EXPRESSION STYLE

(71) Applicant: EXCALIBUR IP, LLC, Sunnyvale, CA (US)

(72) Inventor: Stewart Smith, Brooklyn, NY (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 154 days.

(21) Appl. No.: 14/459,835

(22) Filed: Aug. 14, 2014

(65) Prior Publication Data
US 2016/0050166 A1 Feb. 18, 2016

(51) Int. Cl.
*H04L 12/58* (2006.01)
*H04L 29/08* (2006.01)
*G06F 17/22* (2006.01)

(52) U.S. Cl.
CPC ........ *H04L 51/046* (2013.01); *G06F 17/2264* (2013.01); *H04L 51/02* (2013.01); *H04L 51/10* (2013.01); *H04L 67/02* (2013.01)

(58) Field of Classification Search
CPC .............................. H04L 51/046; H04L 67/02
USPC ................................................. 709/203, 206
See application file for complete search history.

(56) References Cited

U.S. PATENT DOCUMENTS

| 8,577,671 | B1* | 11/2013 | Barve | G06F 17/30522 704/9 |
| 9,042,923 | B1* | 5/2015 | Mirho | H04W 4/14 455/412.1 |
| 2004/0122906 | A1* | 6/2004 | Goodman | G06Q 10/107 709/206 |
| 2005/0108329 | A1* | 5/2005 | Weaver | H04L 12/1822 709/204 |
| 2005/0204002 | A1* | 9/2005 | Friend | G06Q 10/107 709/206 |
| 2006/0031304 | A1* | 2/2006 | Bagga | G06Q 10/107 709/206 |
| 2006/0069728 | A1* | 3/2006 | McEvilly | G06F 17/2264 709/206 |
| 2007/0179971 | A1* | 8/2007 | Benson | G06F 17/248 |
| 2007/0271347 | A1* | 11/2007 | Logue | G06F 3/1208 709/206 |
| 2008/0005284 | A1* | 1/2008 | Ungar | H04L 12/1859 709/219 |
| 2008/0201411 | A1* | 8/2008 | Paritosh | H04L 12/585 709/203 |

(Continued)

*Primary Examiner* — Ranodhi Serrao
*Assistant Examiner* — James Fiorillo
(74) *Attorney, Agent, or Firm* — Cooper Legal Group, LLC

(57) ABSTRACT

Many computing scenarios enable a user to send a message to a user expressing a statement, such as a "happy birthday" message or a "let's meet for lunch" message, and may seek assistance in composing the message. Some services may suggest stock messages, which the user may browse and select, but the generic, impersonal style of the messages may be apparent to the recipient. Presented herein are techniques for composing a message from a user to a recipient expressing a selected statement in the personalized style of the user. Such techniques involve evaluating an expression set (e.g., a mailbox or text message set) of the user to identify an expression style of the user when expressing such statements to such recipients, and composing a message that expressing the statement in the expression style of the user.

20 Claims, 10 Drawing Sheets

(56) References Cited

U.S. PATENT DOCUMENTS

| | | | | |
|---|---|---|---|---|
| 2009/0144385 | A1* | 6/2009 | Gold | G06Q 30/00 709/206 |
| 2009/0292779 | A1* | 11/2009 | Edlund | G06Q 10/10 709/206 |
| 2010/0223349 | A1* | 9/2010 | Thorson | G06Q 10/107 709/206 |
| 2010/0228693 | A1* | 9/2010 | Dawson | G06F 17/2705 706/12 |
| 2010/0257243 | A1* | 10/2010 | Eilers | G06F 17/2247 709/206 |
| 2010/0306154 | A1* | 12/2010 | Poray | G06Q 30/02 706/47 |
| 2011/0022418 | A1* | 1/2011 | He | G09G 3/3648 705/4 |
| 2012/0117163 | A1* | 5/2012 | Lester | G06Q 10/109 709/206 |
| 2012/0124149 | A1* | 5/2012 | Gross | G06F 17/30873 709/206 |
| 2012/0254318 | A1* | 10/2012 | Poniatowskl | H04N 21/4788 709/206 |
| 2013/0103814 | A1* | 4/2013 | Carrasco | H04L 65/4015 709/223 |
| 2013/0117267 | A1* | 5/2013 | Buryak | G06F 17/30598 707/737 |
| 2013/0166657 | A1* | 6/2013 | Tadayon | H04M 1/72552 709/206 |
| 2013/0275429 | A1* | 10/2013 | York | G06F 17/30029 707/737 |
| 2013/0339465 | A1* | 12/2013 | Zhang | H04L 51/16 709/206 |
| 2014/0164507 | A1* | 6/2014 | Tesch | H04L 51/10 709/204 |
| 2014/0201296 | A1* | 7/2014 | Patfield | H04L 51/04 709/206 |
| 2014/0250196 | A1* | 9/2014 | Joao | G06F 17/30864 709/206 |
| 2014/0280634 | A1* | 9/2014 | Mansfield | H04L 51/10 709/206 |
| 2014/0359039 | A1* | 12/2014 | Capasso | H04L 51/046 709/206 |
| 2014/0379813 | A1* | 12/2014 | Charania | H04L 51/02 709/206 |
| 2015/0334168 | A1* | 11/2015 | Kosslyn | H04L 67/10 709/204 |
| 2016/0275522 | A1* | 9/2016 | Zhang | G06Q 30/016 |
| 2017/0364583 | A1* | 12/2017 | Buryak | G06F 17/30867 |

* cited by examiner

FIG. 12

1200
1202 MESSAGE TEMPLATE SET
1204 HAPPY BIRTHDAY

| ROMANTIC (606) | RELIGIOUS (606) | CONSOLATION (606) |
|---|---|---|
| LET'S MAKE YOUR BIRTHDAY SPECIAL (1206) | HAVE A BLESSED BIRTHDAY! (1206) | WISHING PEACE ON YOUR BIRTHDAY (1206) |
| YOUR BIRTHDAY GIFT IS MY HEART (1206) | I WILL PRAY FOR YOU ON YOUR BIRTHDAY (1206) | A BETTER YEAR IS AHEAD (1206) |
| LET'S GROW OLD TOGETHER, \_\_\_ (1206, 1208) | CELEBRATE FAITH ON YOUR BIRTHDAY (1206) | I'LL BE HERE FOR YOU ON YOUR BIRTHDAY (1206) |
| WILLIAM SHAKESPEARE (612) | JOHN WAYNE (612) | HUMPHREY BOGART (612) |
| TO ME, FAIR FRIEND, YOU CAN NEVER GET OLD (1206) | HAPPY BIRTHDAY, PILGRIM (1206) | THIS IS THE BEGINNING OF A BEAUTIFUL BIRTHDAY (1206) |

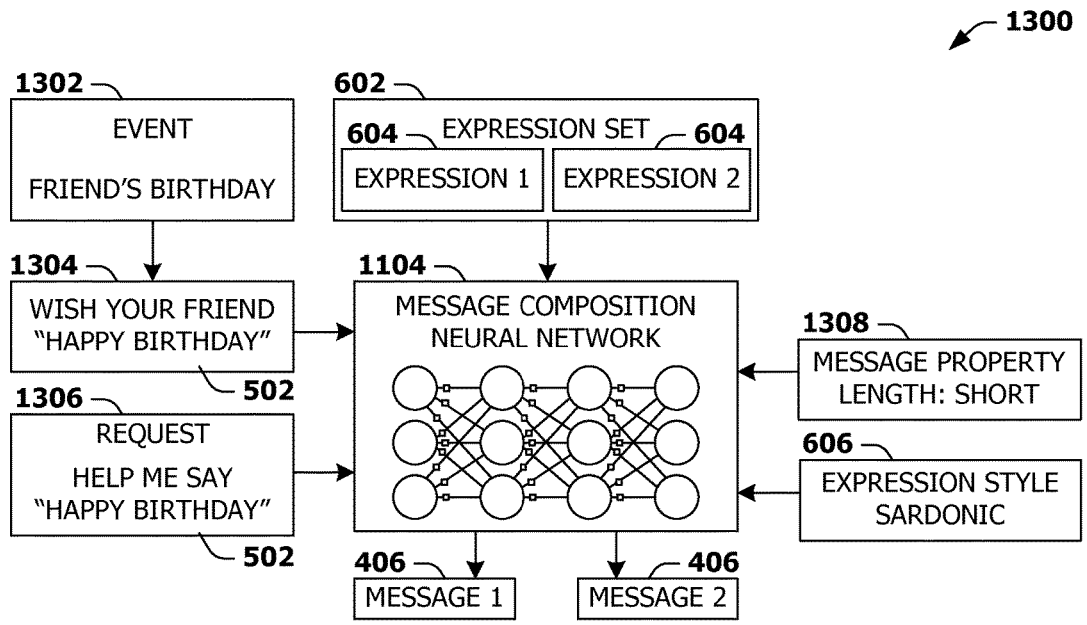

FIG. 13

EXPRESSING STATEMENTS IN MESSAGES WITH PERSONALIZED EXPRESSION STYLE

BACKGROUND

Within the field of computing, many scenarios involve the presentation by a device of a message to a recipient expressing a statement, such as a "happy birthday" statement included in an email message, a social network message, a text message, or a greeting card. Such messages are typically generated by allowing the user to specify the message through a text and/or voice interface, and/or by presenting to the user a collection of stock messages expressing the statement, such as a collection of sample birthday-related greeting cards, and allowing the user to select a greeting card. In some scenarios, a device may detect a message opportunity, such as an instance of the recipient's birthday, and may suggest such as stock message to the user, such as a randomly selected birthday card that the user may wish to send to the recipient. A combination of these techniques may enable a user to include a personalized message in a stock message, such as a personalized salutation included in a stock "happy birthday" message.

SUMMARY

The techniques available for the composition of messages to a user may exhibit various limitations. Messages authored by the user may express the statement from the user in a personalized manner, but may depend upon the time, attention, and creativity of the user in developing the message. Conversely, stock messages may be easier for the user to select, but may exhibit significantly diminished personalization; e.g., a generic "happy birthday" message may be less valuable to the recipient than a personalized message authored by the user. Moreover, a combination of a stock message and a personalized message authored by the user may express the statement in an inconsistent and disjointed tone, wherein part of the message exhibits the particular personality of the user and part of the message exhibits an impersonal tone that is related to neither the user nor the recipient.

The present disclosure provides techniques for automatically generating a message expressing a statement to a recipient that exhibits an expression style of an individual. For example, if the user requests a "happy birthday" message for a recipient in the expression style of an individual (e.g., in the expression style of the user or another individual), a server may examine an expression set of the individual, such as the individual's set of messages previously expressed by the individual, and may identify various expression styles of the individual, such as the individual's expression tone (e.g., formal, casual, warm, cool, religious, enthusiastic, or sardonic), and/or phrases that the individual frequently uses when expressing such statements to recipients (e.g., ways that the individual has expressed the statement "happy birthday" to the recipient and other individuals). A server may compose a message expressing the statement in the expression style of the individual (e.g., selecting a message template that matches the expression style of the individual, and/or re-using phrases from related expressions of the individual), and may present it to the user for approval and/or adjustment before transmitting the message to the recipient. In this manner, the server may automatically generate messages for statements that the user wishes to express, and that are personalized according to the expression style of the individual as determined from previous expressions of the individual, in accordance with the techniques presented herein.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

FIG. 12 is an illustration of a scenario featuring a database of frequently arising phrases of respective individuals that may be used to compose a message in the expression style of an individual in accordance with the techniques presented herein.

FIG. 13 is an illustration of a scenario featuring the use of an adaptive algorithm to generate messages from an expression set and input from a user interface in accordance with the techniques presented herein.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Computing Scenario

The following disclosure provides a discussion of some types of computing scenarios in which the presently disclosed techniques may be utilized.

1.1. Networking

Figure 1:
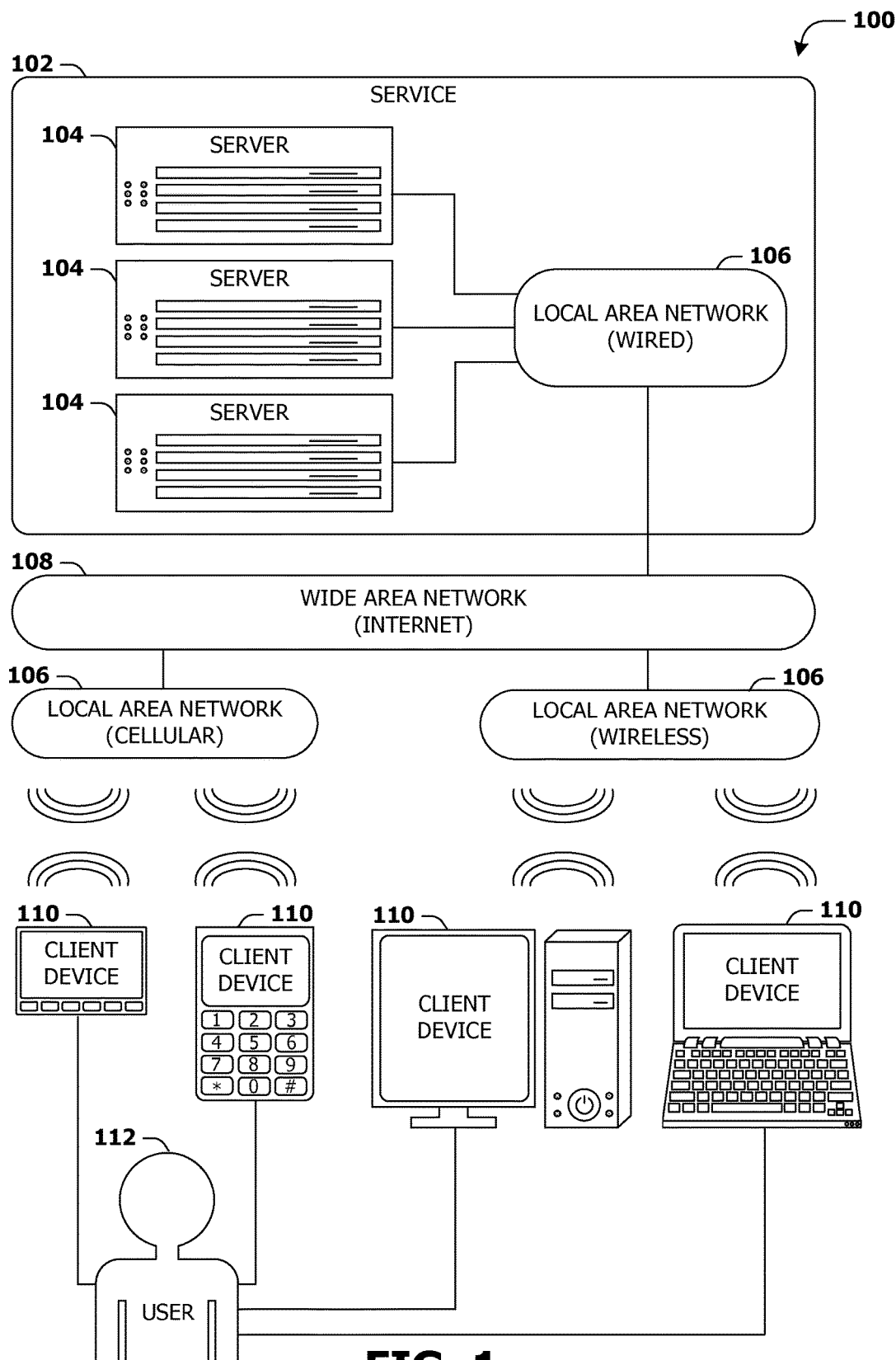
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may also be interconnected directly, or through one or more other networking devices, such as routers, switches, and repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may also include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and mesh architectures, and/or also a variety of roles, such as administrative servers, authentication servers, security monitor servers, data stores for objects such as files and databases, business logic servers, time synchronization servers, and front-end servers providing a user-facing interface to the service 102.

Likewise, a local area network 106 may comprise one or more sub-networks, such as may employ differing architectures or may be compliant or compatible with differing protocols, may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and client devices 110. The wide area network 108 may encompass various combinations of devices with varying levels of distribution and exposure, such as a public wide-area network (e.g., the Internet), or a private network (e.g., a virtual private network (VPN) of a distributed enterprise).

In the scenario 100 of FIG. 1, the service 102 may be accessed via the wide area network 108 by a user 112 of a set of client devices 110, such as a portable media player (e.g., an electronic text reader, an audio device, or a portable gaming, exercise, or navigation device); a portable communication device (e.g., a camera, a phone, or a text chatting device); a workstation; and a laptop form factor computer. The respective client devices 110 may communicate with the service 102 via various connections to the wide area network 108. As a first such example, one or more client devices 110 may comprise a cellular communicator, and may connect to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
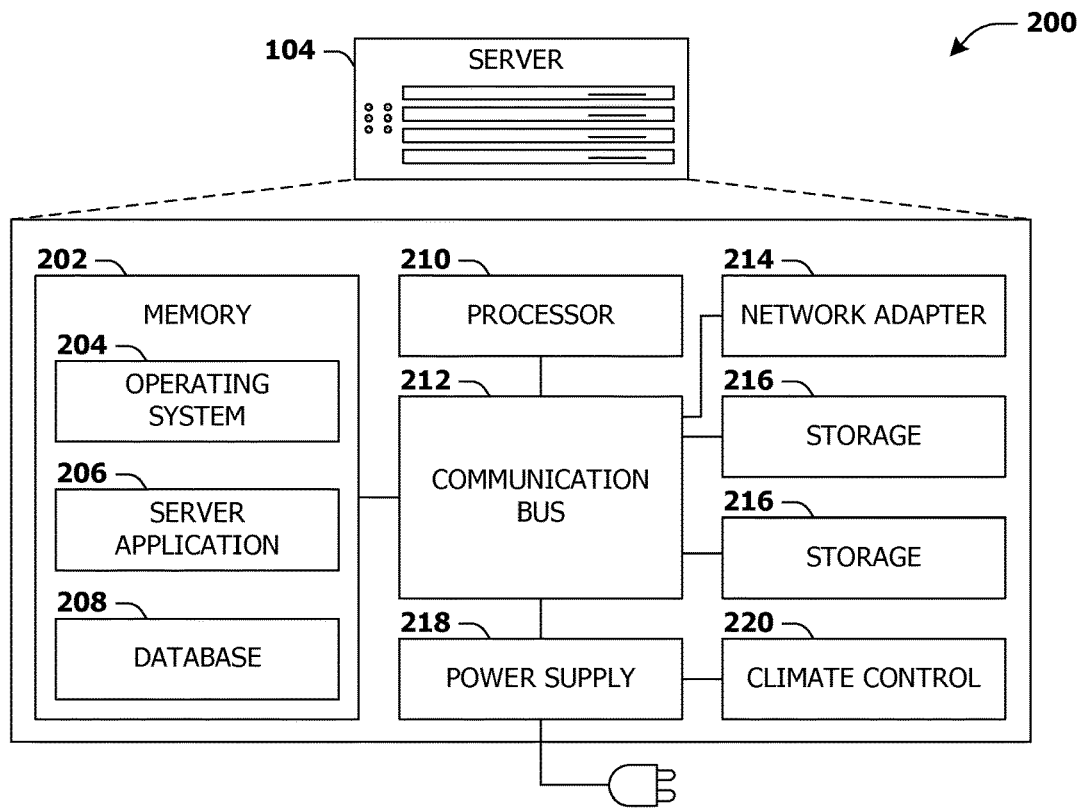
FIG. 2 is an illustration of a scenario involving an example configuration of a server that may utilize at least a portion of the techniques presented herein.

FIG. 2 presents a schematic architecture diagram 200 of a server 104 that may utilize at least a portion of the techniques provided herein. Such servers 104 may vary widely in configuration or capabilities, alone or in conjunction with other servers 104, in order to provide a service 102.

A server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A server 104 may also comprise a memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may also comprise a variety of peripheral components, such as a wired and/or wireless network adapter 214 connectible to a local area network 106 and/or wide area network 108; one or more storage components 216, such as a hard disk drive, a solid-state storage device (SSD), a flash memory device, and/or a magnetic and/or optical disk reader. The server 104 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. In a multibus scenario, a communication bus 212 may interconnect the server 104 with at least one other server 104. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

A server 104 may also operate in various physical enclosures, such as a desktop or tower, and/or may be integrated with a display as an "all-in-one" device. A server 104 may also be mounted horizontally and/or in a cabinet or rack, and/or may simply comprise an interconnected set of components. A server 104 may also comprise a dedicated and/or shared power supply 218 that supplies and regulates power for the other components. The server 104 may also provide power to and/or receive power from another server 104 and/or other devices. The server 104 may also comprise a shared and/or dedicated climate control unit 220 that regulates climate properties, such as temperature, humidity, and airflow. Many such servers 104 may be configured and/or adapted to utilize at least a portion of the techniques presented herein.

1.3. Client Device Configuration

Figure 3:
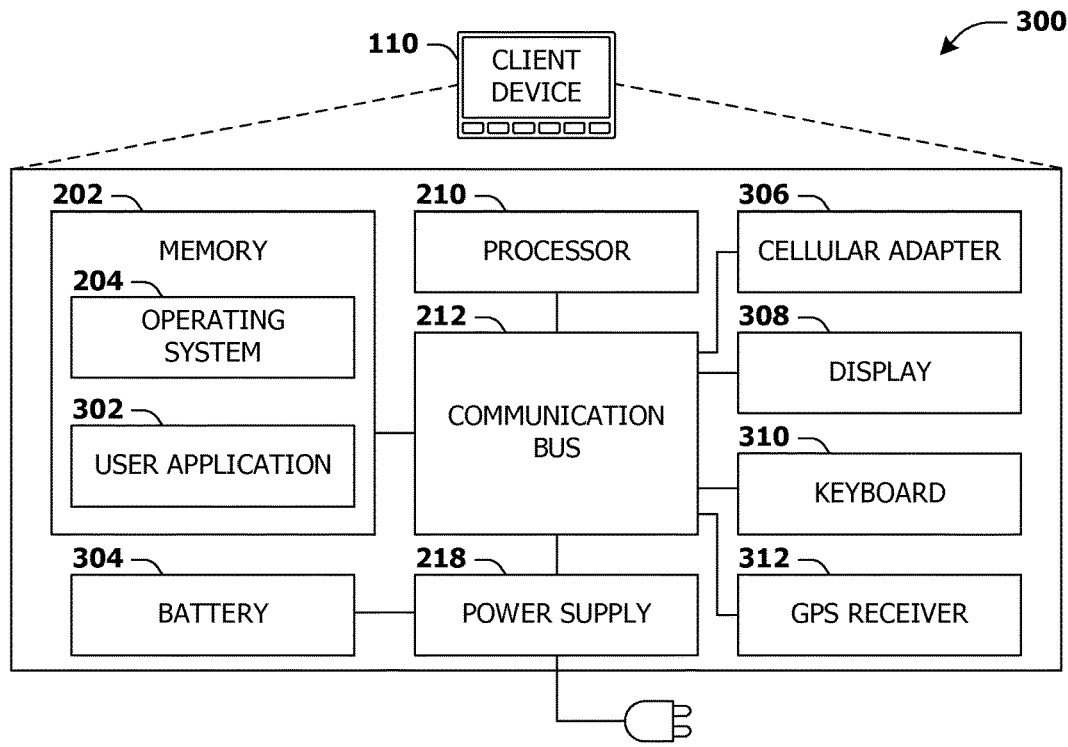
FIG. 3 is an illustration of a scenario involving an example configuration of a client that may utilize at least a portion of the techniques presented herein.

FIG. 3 presents a schematic architecture diagram 300 of a client device 110 operable by a user 112, whereupon at least a portion of the techniques presented herein may be implemented. Such client devices 110 may vary widely in configuration or capabilities, in order to provide a variety of functionality to the user 112. A client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and a component of a piece of furniture, such as a tabletop, and/or of another device, such as a vehicle or residence. A client device 110 may also serve the user 112 in a variety of roles, such as a workstation, kiosk, media player, gaming device, and/or appliance.

A client device 110 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A client device 110 may also comprise a memory 202 storing various forms of applications, such as an operating system 204; one or more user applications 302, such as document applications, media applications, file and data access applications, communication applications such as web browsers and email clients, utilities, and games; and drivers for various peripherals. A client device 110 may also comprise a variety of peripheral components, such as a wired and/or wireless network adapter 214 connectible to a local area network 106 and/or wide area network 108; one or more output components, such as a display 308 coupled with a display adapter (optionally including a graphical processing unit (GPU)), a sound adapter coupled with a speaker, and a printer; input devices for receiving input from the user 112, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, and/or an compass, accelerometer, and/or gyroscope that detects a physical orientation of the client device 110. Other components that may optionally be included with the client device 110 (though not shown in the schematic diagram 300 of FIG. 3) include one or more storage components 216, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

A client device 110 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. A client device 110 may also comprise a dedicated and/or shared power supply 218 that supplies and regulates power for the other components, and/or a battery 304 that stores power for use while the client device 110 is not connected to a power source via the power supply 218. The client device 110 may also provide power to and/or receive power from other client devices 110.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user 112 via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may also include one or more servers that may locally serve the client device 110 and/or other client devices 110 of the user 112 and other individuals. For example, a locally installed webserver may provide web content in response to locally submitted web requests. Many such client devices 110 may be configured and/or adapted to utilize at least a portion of the techniques presented herein.

1.4. Message Services and Message Providers

Figure 4:
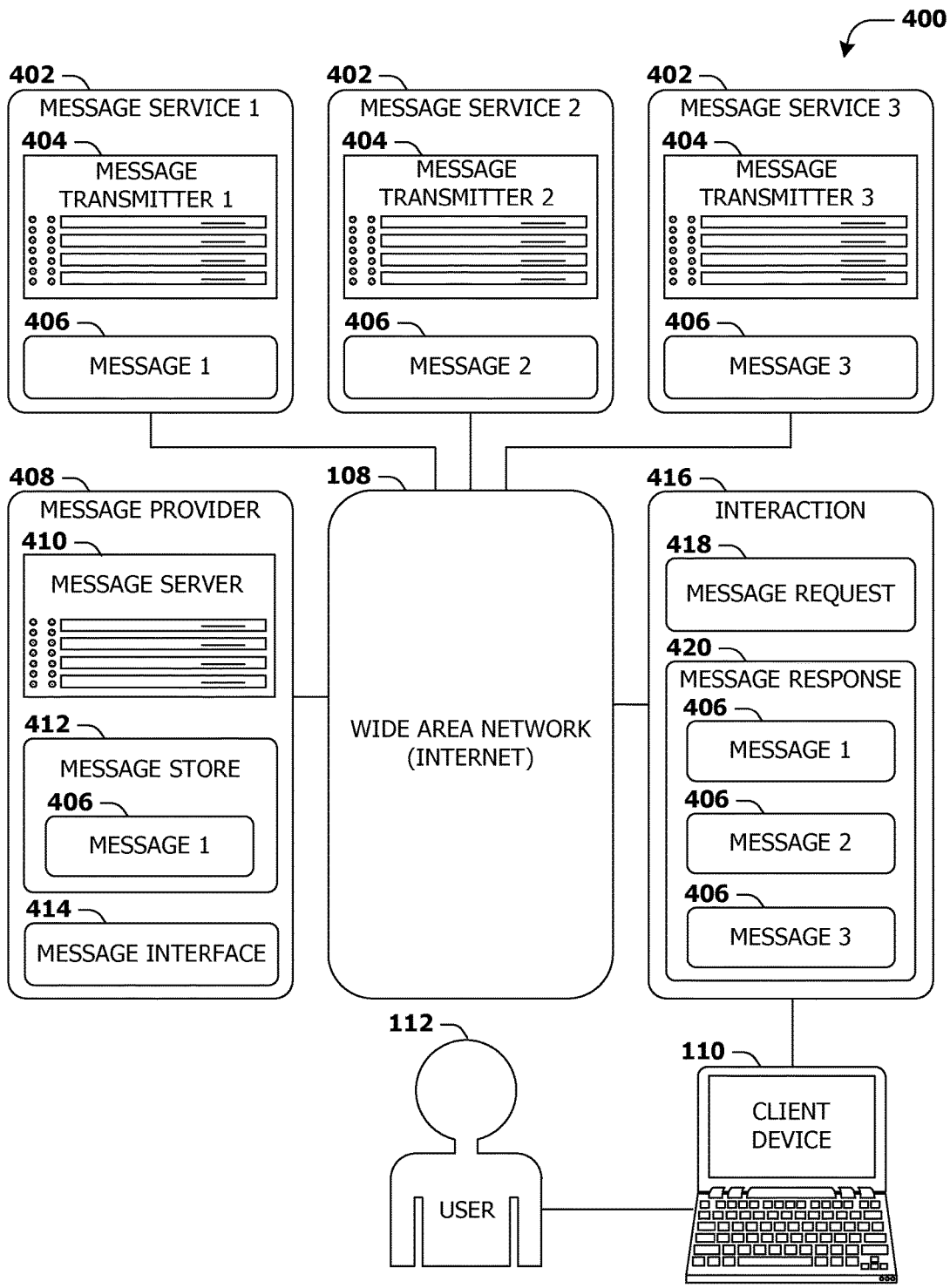
FIG. 4 is an illustration of a scenario involving an example message server that may utilize at least a portion of the techniques presented herein.

FIG. 4 is an interaction diagram of a scenario 400 featuring a message provider 408 that stores and delivers messages 406 to a user 112. In this scenario 400, a set of message services 402 respectively comprise a message transmitter 404 that transmits messages 406 to the message provider 408. Such messages 406 may include, e.g., email messages; simple message service (SMS) and/or media message service (MMS) messages; chat messages, such as in a forum or instant messaging scenario; and voice-based messages, such as in a telephony or voicemail scenario. Such messages 406 may also include various forms of content items, such as text, articles, pictures, video, audio, applications, data files, and output from devices such as cameras. A message provider 408 is provided, comprising a message server 410 that interacts with the message transmitters 402 over a wide area network 108, such as the Internet, to receive, store, and provide the messages 406 transmitted thereby. The message provider 408 may be deployed in a distributed manner across at least two message servers 410, which may be organized by role (e.g., a first message server 410 that receives and sores the messages 406, and a second message server 410 that provides the messages 406 to the user 112 and/or client devices 110) and/or geographically (e.g., various message servers 410 may be provided to service client devices 110 in different physical locations). Components may be duplicated within the message provider 408; e.g., two or more message servers 410 may be provided to facilitate the reliability, response time, and/or scalability of the message provider 408.

As further illustrated in the scenario 400 of FIG. 4, a user 112 of a client device 110 may engage in an interaction 416 with the message provider 408. For example, the message provider 408 may provide a message interface 414 to the client device 110 for presentation to the user 112, such as a webmail interface that enables the user 112 to access email messages 406 through a web browser over the wide area network 108. Through the message interface 414, the user 112 may, through the client device 110, initiate a message request 418 asking the message provider 408 to deliver messages 406 that have been stored for delivery to the user 112. The message provider 408 may examine the message store 412 to retrieve any messages 406 stored for delivery to the user 112, and may generate a message response 420 including the messages 406 to be delivered to the user 112.

The user 112 may also be permitted to generate messages 406 for transmission to other users 112, Many such message providers 408 may be devised, and may variously utilize the techniques presented herein. Such messages 406 may be generated by the user 112 in response to preceding messages 406 that were directed to the user 112, or may be newly initiated by the user 112. Such messages 406 may also be requested by the user 112 for delivery to a specific recipient or recipient set, such as any other participants in a particular forum or chat session, or may be broadcast for receipt by any other user 112. The user 112 may also choose to format the message 406 in various ways (e.g., a text message, a voice message, or a gesture), and/or may attach many types of content to the message 406 (e.g., images, videos, uniform resource identifiers (URIs), documents, and files). The message provider 408 may receive the message 406 from the user 112; may apply various forms of processing to the message 406 (e.g., translating an expression of the message 406 from a first language to a second language, or from a first modality to a second modality, such as translating a voice message to a text message; scanning attached objects for errors or malware; and compressing and/or digitally signing the object), and may, promptly or after a delay, transmit the message 406 to one or more other message services 402 (e.g., as an email message, simple message service (SMS) text message, or a media message service (MMS) message).

More particularly, some message providers 408 may assist users 112 in composing messages to other users 112. For example, a message provider 408 may provide a set of stock messages 406 that may express various sentiments, such as electronic greeting cards that are created by a designer in association with an event, such as a holiday or a life event such as a birthday; in association with a context, such as a message exchanged between family members or colleagues; and/or in association with a sentiment, such as an optimistic message, an encouraging message, an apologetic message, or a sympathetic message. A user 112 wishing to express a message 406 may browse through the available stock messages 406 in order to select one that most closely expresses the user's feelings.

Figure 5:
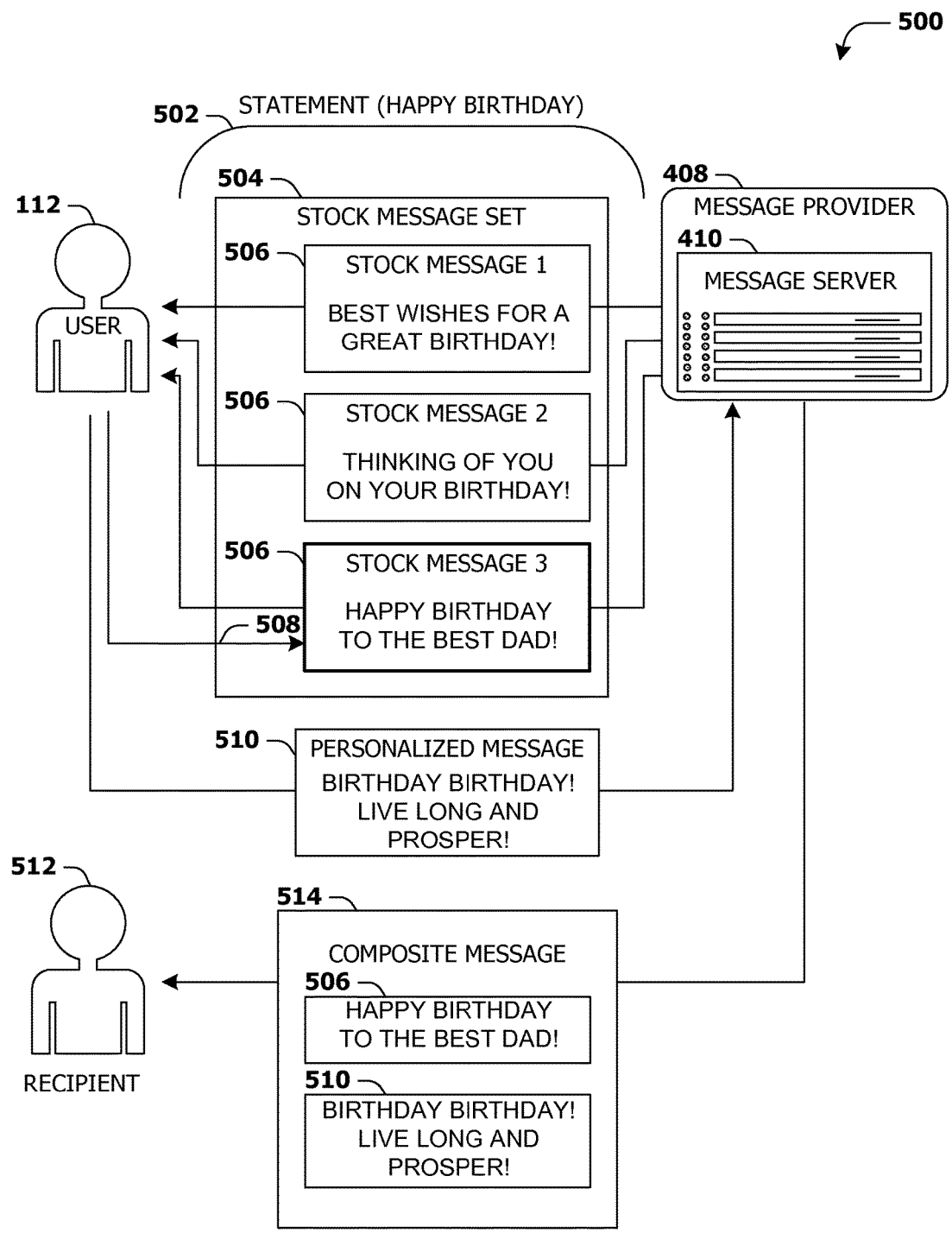
FIG. 5 is an illustration of a scenario featuring examples of techniques for enabling a user to transmit a message to a recipient.

FIG. 5 is an interaction diagram of a scenario 500 involving one such interaction 416 of a user 112 with the message provider 408. In this scenario 500, a user 112 seeks to send a message to a recipient 512 expressing a particular statement 502, such as a "happy birthday" statement. The user 112 accesses a message provider 408 that stores a stock message set 504 of stock messages 506 expressing various statements 502. The user 112 may browse the stock message set 504, and may select 508 a stock message 506 that most closely expresses the statement 502 on behalf of the user 112. The user 112 may also author a personalized message 510 to the recipient 512, which may be appended to the selected stock message 506. The resulting composite message 514, comprising the selected stock message 506 and appending the personalized message 510, may be stored by the message server 410 of the message provider 408, and then delivered to the recipient 512 on behalf of the user 112.

While the interaction depicted in the scenario 500 of FIG. 5 enables the user 112 to present a composite message 514 to the recipient 512, it may be appreciated that the techniques utilized by the message provider 408 in this scenario 500 may present some disadvantages. As a first such example, the message provider 408 may provide stock messages 506 to the user 112, but such stock messages 506 are necessarily generic, and are not particularly personalized to the user 112, the recipient 512, and the relationship there between. That is, while a robust stock message set 504 may include quite specific stock messages 506, such as a happy birthday statement 502 that might be expressed by a prototypical older brother to a prototypical younger sister, the stock messages 506 are still necessarily impersonal. Moreover, such impersonal expressions of statements 502 may be readily apparent to the recipient 512 (as such stock messages 506 do not include anything personal beyond the prototypical relationship), and, accordingly, may have little or no value to the recipient 512. As a second such example, the message provider 408 does not assist the user 112 in authoring the personalized message 510, and it may be difficult for the user 112 to generate an expression of the statement 502 to the recipient 512. As a third such example, the aggregation of the stock message 506 and the personalized message 510 may present an inconsistent, and perhaps jarring, change in tone in the composite message 514; e.g., the transition between the stock message 506 and the personalized message 510 may be readily apparent as an abrupt shift in tone that may seem tacky to some recipients 512. These and other disadvantages may arise from the generation of the composite message 514 as provided in the scenario 500 of FIG. 5.

2. Presented Techniques

Figure 6:
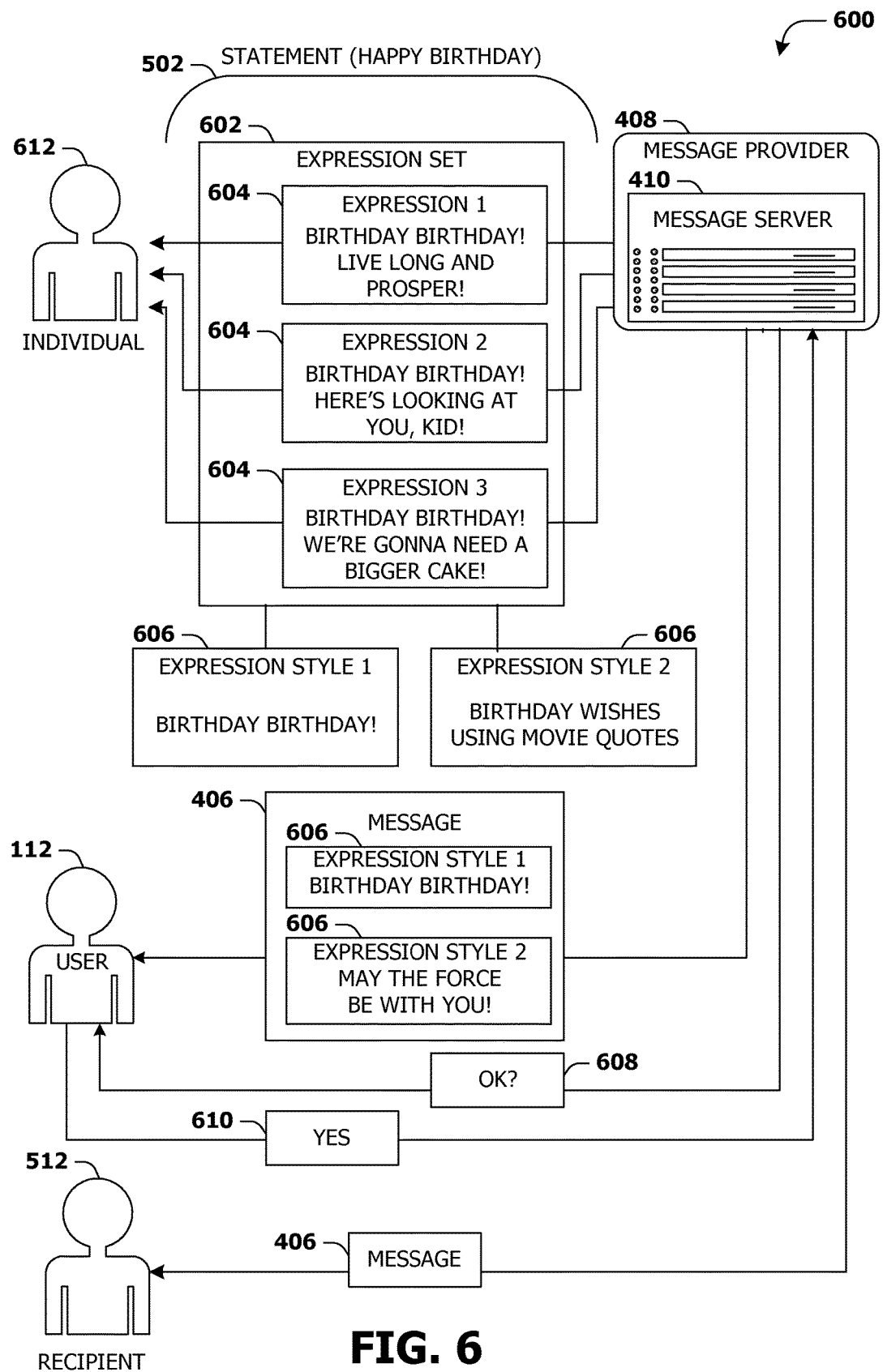
FIG. 6 is an illustration of a scenario featuring an example technique for composing a message from a user to a recipient that expresses a statement in an expression style of an individual in accordance with the techniques presented herein.

FIG. 6 is an illustration of a scenario 600 featuring a technique for assisting a user 112 with the composition of a message 406 to a recipient 512 in accordance with the techniques presented herein.

In this scenario 600, a user 112 seeks to express a statement 502 to the recipient 512, such as a "happy birthday" message. However, the user 112 may not wish to send a stock or generic message to the recipient 512, and may seek assistance in developing a personalized expression of the statement 502 to the recipient 512 in the style of a particular individual 612, such as the user 112 or another individual 612. Additionally, a message server may have access to an expression set 602 of expressions 604 authored by the individual 612 may be associated with a set of expressions 604 that the individual 612, such as a set of email messages, text messages, or chat messages, has previously expressed to the recipient 512, the user 112, and/or other individuals.

Accordingly, a message provider 408 utilizing the techniques may generate a message 406 expressing the statement 502 from the user 112 to the recipient 512 in the expression style 606 of the individual 612. The message server 410 may evaluate the expressions 604 of the expression set 602 to identify the expression style 606 of the individual 612. For example, the message server 410 may determine that the individual 612 frequently utilizes a particular phrase when expressing the statement 502, such as "Birthday Birthday!", or may frequently use expressions 604 that include phrases from a particular source of material, such as a religious text, lyrics from songs of a particular musician, or quotes from a particular book, television show, or film. Having identified the expression style 606 of the individual 612, the message server 410 may generate a message 406 that expresses the statement 502 requested by the user 112 in the expression style 606 of the individual 612, such as a "happy birthday" statement 502 that both utilizes a phrase frequently included by the individual 612 in expressions 604 of the statement, and a quote from a favorite film that the individual 612. The message 406 may be presented 608 to the user 112 for confirmation, and responsive to receiving such confirmation 610 from the user 112, the message server 410 may transmit the message 406 to the recipient 512. In this manner, the message provider 408 may facilitate the user 112 in generating a message 406 expressing the statement 502 to the recipient 512 in an expression style 606 selected by the user 112 in accordance with the techniques presented herein.

3. Technical effect

The techniques presented herein and illustrated in the scenario 600 of FIG. 6 may provide a variety of technical effects for the client device 110 and/or the message provider 410.

As a first technical effect, an automated composition of messages 406 may enable a message server 410 to compose personalized messages 406 automatically for the user 112, and may do so in a manner that reduces the input of the individual 612 involved in composing the personalized message 406 from the user 112 to the recipient 512. For example, the user 112 does not have to browse through a set of stock messages 506, many of which may not feature any appreciable degree of personalization on behalf of the user 112. The techniques presented herein therefore enable a more convenient user experience for the user 112 than may be achievable through techniques utilizing stock messages 506.

As a second technical effect, an automated composition of messages 406 utilizing the expression set 602 of the individual 612 may enable the message server 410 to generate such messages without having to store and/or utilize a stock message set 504. For example, message providers 408 may store an extensive stock message set 504 to express various types of statements 502 on behalf of the user 112. However, the stock message set 504 may be expensive, time-consuming, and resource-intensive to generate and to access (e.g., if the user 112 has to browse dozens of pages of stock messages 506 to select 508 find an acceptable stock message 506, the message server 410 may be extensively utilized in the browsing capability). Alternatively or additionally, storing the stock message set 504 on a comparatively resource-limited device, such as a mobile phone, may consume a significant amount of storage capacity. By contrast, the techniques presented herein may be achieved only by relying on an expression set 602 of the individual 612 that is already stored by the message server 410 (e.g., a device may already store a set of email messages of the user 112 simply as a mailbox, and evaluating the expression set 602 may utilize the mailbox instead of utilizing an ad hoc stock message set 504). Similarly, a message provider 408 that services a large number of users 112 may scale more efficiently to a large number of users 112 if utilizing the expression sets 602 of the individuals 612 rather than a stock message set 504. These and other technical effects may be achievable through the configuration of a message provider 408 in accordance with the techniques presented herein.

4. Example Embodiments

Figure 7:
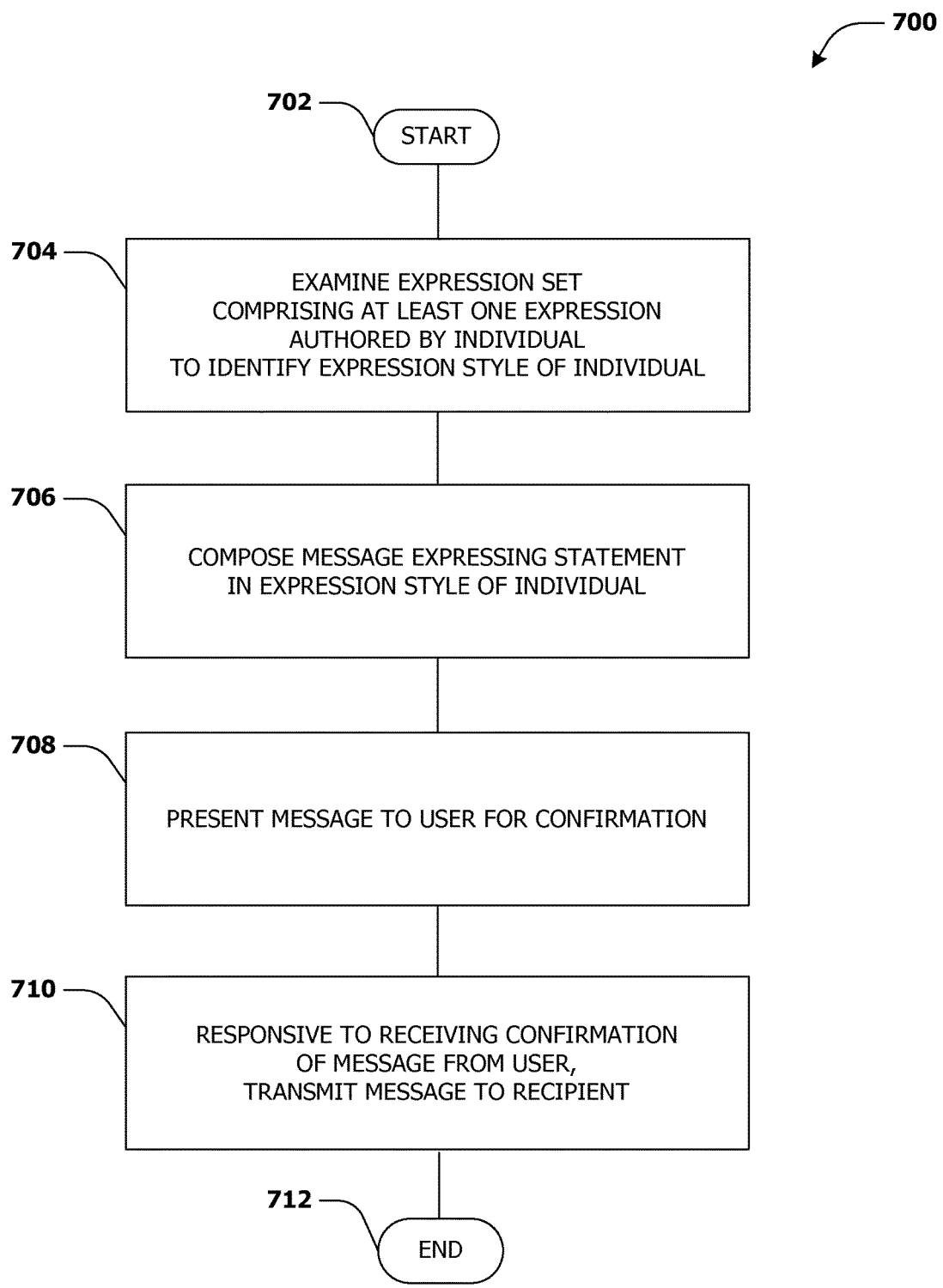
FIG. 7 is an illustration of a scenario featuring an example method of composing a message expressing a statement in an expression style of an individual in accordance with the techniques presented herein.

FIG. 7 presents an illustration of a first example embodiment of the techniques presented herein, illustrated as an example method 700 of expressing a statement 502 to a recipient 512 on behalf of a user 112 on a device having a processor. The example method 700 may be implemented, e.g., as instructions stored in a memory (e.g., a hard disk drive, a solid-state storage device such as a flash memory device, or a magnetic or optical disc) that, when executed on a processor 210 of a computer such as a client device 112 and/or a server 104, cause the computer to operate according to at least a portion of the techniques presented herein.

The example method 700 begins at 702 and comprises examining 704 an expression set 602 comprising at least one expression 604 authored by an individual 612 to identify an expression style 606 of the individual 612. The example method 600 further comprises composing 706 a message 406 expressing the statement 502 in the expression style 606 of the individual 612. The example method 600 further comprises presenting 708 the message 406 to the user 112 for confirmation 610; and responsive to receiving the confirmation 610 of the message 406 from the user 112, transmitting 710 the message 406 to the recipient 512. In this manner, the example method 700 achieves the expression of the statement 502 from the user 112 to the recipient 512 in the expression style 606 of the individual 612 in accordance with the techniques presented herein, and so ends at 712.

Figure 8:
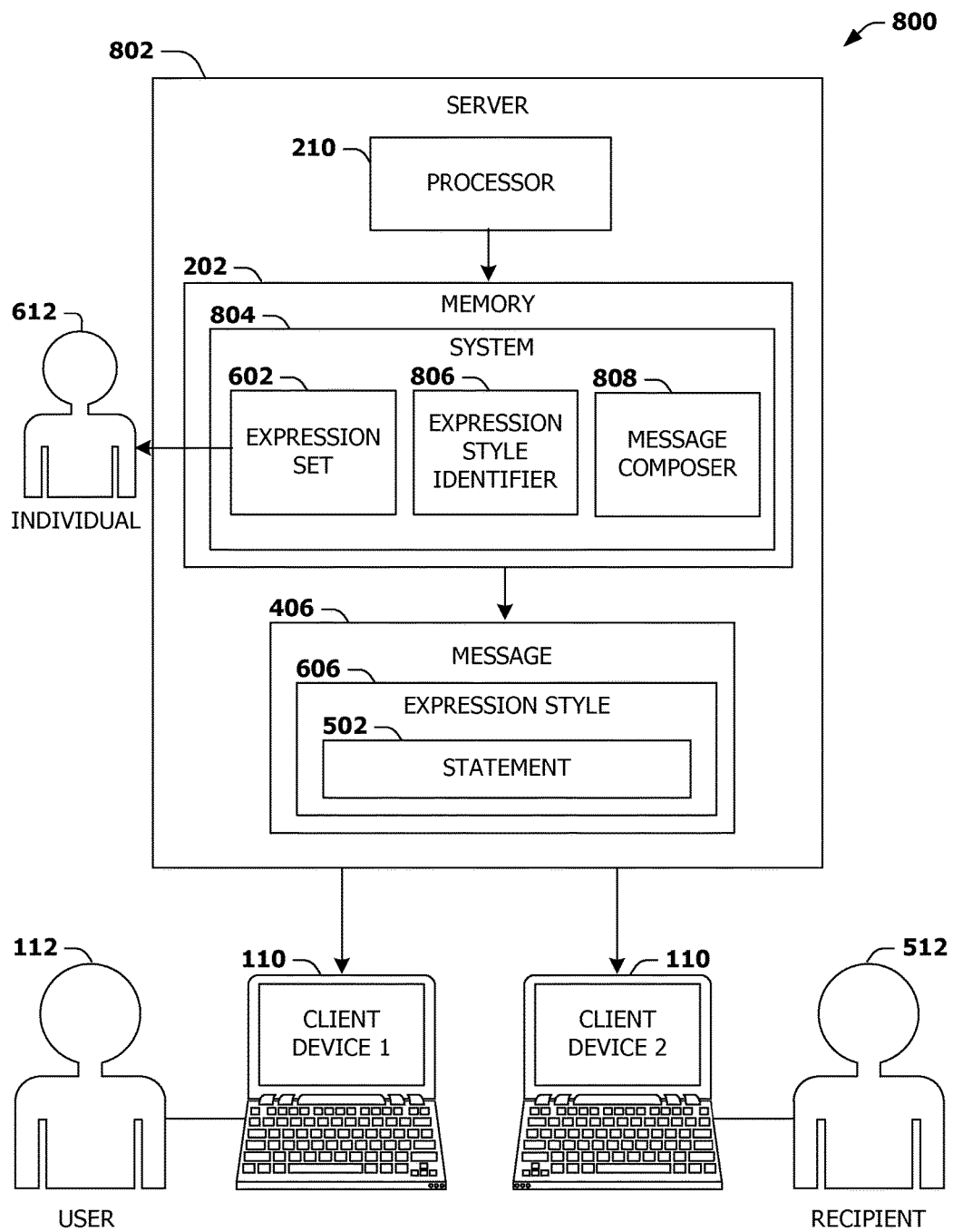
FIG. 8 is an illustration of a scenario featuring an example server that composes a message expressing a statement in an expression style of an individual in accordance with the techniques presented herein.

FIG. 8 presents an illustration of a scenario 800 involving a second example embodiment of the techniques presented herein, comprising a server 802 that expresses a statement 502 to a recipient 512 according to an expression style 606 of an individual 612. The server 802 may comprise a processor 210 and a memory 202 (e.g., a hard disk drive, a solid-state storage device such as a flash memory device, or a magnetic or optical disc) storing instructions that provide an example system 804, e.g., as a set of components that interoperate according to the techniques presented herein.

In particular, the memory 202 comprises the components of an example system 804 featuring an expression set 602, which comprises at least one expression 604 authored by an individual 612. The example system 804 further comprises instructions that, when executed by the processor 210, provide an expression style identifier 806 that examines the expression set 602 to identify the expression style 606 of the individual 612; and a message composer 808 that composes a message 406 expressing the statement 502 in the expression style 606 of the individual 612; presents the message 406 to the user 112 for confirmation 610; and responsive to receiving the confirmation 610 of the message 406 from the user 112, transmits the message 406 to the recipient 512. In this manner, the system 804 causes the server 802 in the scenario 800 of FIG. 8 to operate in accordance with the techniques presented herein.

Figure 9:
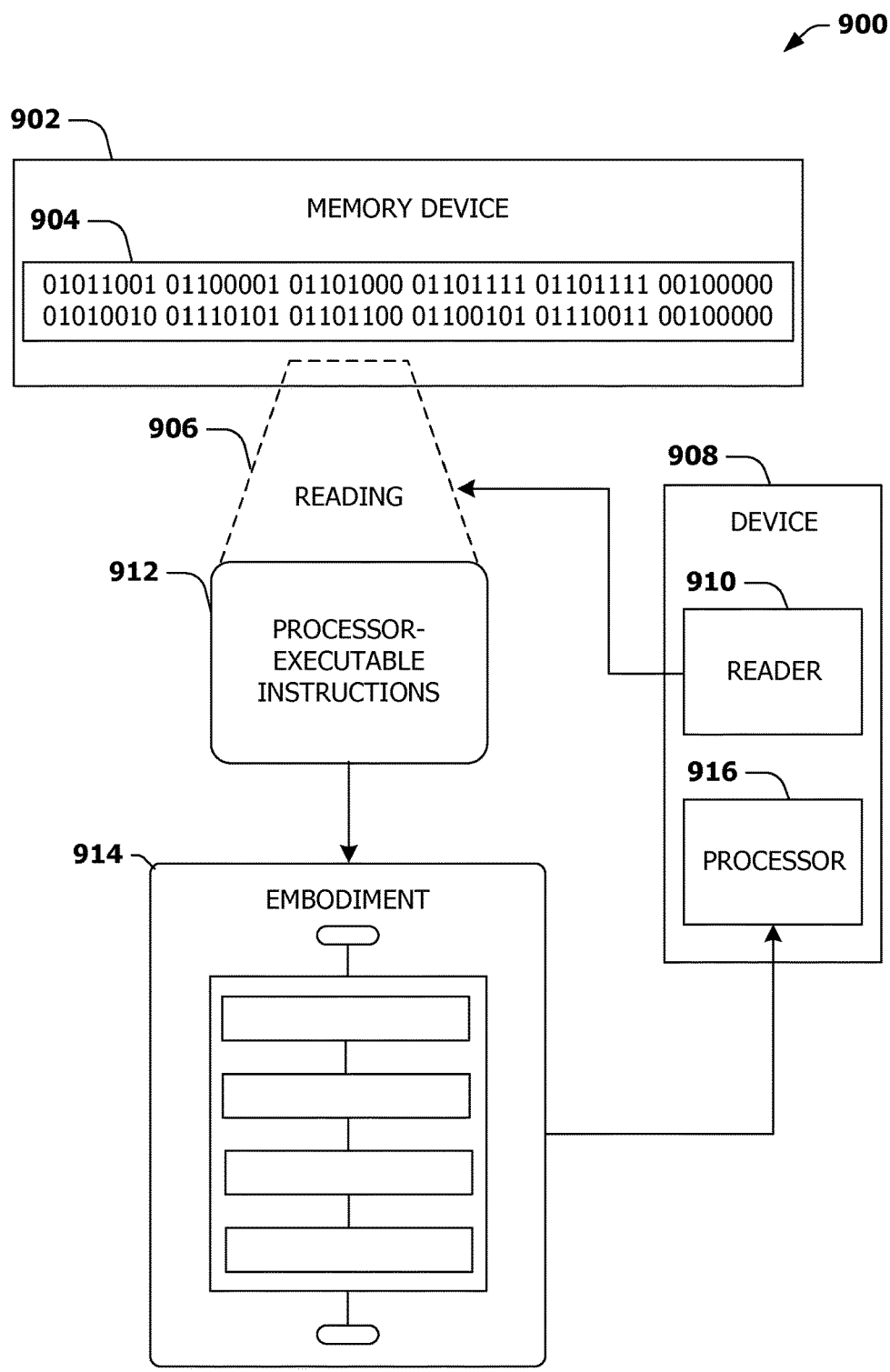
FIG. 9 is an illustration of a scenario featuring an example nontransitory memory device that causes a server to compose a message expressing a statement in an expression style of an individual in accordance with the techniques presented herein.

FIG. 9 is an illustration of a scenario 900 involving a third example embodiment of the techniques presented herein, comprising an example nontransitory memory device 902, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912.

The execution of the processor-executable instructions 912 on the processor 916 causes the device 908 to express a statement 502 from a user 112 to a recipient 512 according to an expression style 606 of an individual 612. In particular, the processor-executable instructions 912 cause the device 908 to examine 704 an expression set 602 comprising at least one expression 604 authored by an individual 612 to identify an expression style 606 of the individual 612. The processor-executable instructions 912 also cause the device 908 to compose 706 a message 406 expressing the statement 502 in the expression style 606 of the individual 612. The processor-executable instructions 912 also cause the device 908 to present 708 the message 406 to the user 112 for confirmation 610. The processor-executable instructions 912 also cause the device 908 to, receiving the confirmation 610 of the message 406 from the user 112, transmit 710 the message 406 to the recipient 512. In this manner, the example nontransitory memory device 902 causes the device 908 to express the statement 502 present the content item 406 to the user 112 in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 700 of FIG. 7; the example system 804 of FIG. 8; and the example nontransitory memory device 902 of FIG. 9) to confer individual and/or synergistic advantages upon such embodiments.

5.1. Identifying Expression Styles

A first aspect that may vary among embodiments of the techniques presented herein involves the manner of identifying the expression styles 606 from an expression set 602 of expressions 604 of an individual 612.

As a first variation of this first aspect, the identity of the individual 612 may vary according to the request of the user 112. As a first such example, the individual 612 may also be the user 112; e.g., the user 112 may request that the message provider 408 compose a message in his or her own expression style 606. As a second such example, the individual 612 may be the recipient 512; e.g., the user 112 may request the message provider 408 to express a statement 502 to the recipient 512 in the recipient's own expression style 606. As a third such example, the individual 612 may comprise a third party for whom an expression set 602 is available, such as a famous celebrity or author, or a character in a work of fiction.

As a second variation of this first aspect, the expression styles 602 may be identified from various types of expression sets 602, such as email messages in a mailbox; chat messages written by the individual 612 in a chat context, such as an instant messaging context or a web forum; text messages sent by the individual 612 to other individuals, such as Simple Message Service (SMS) messages; spoken utterances of the individual 612 during various conversations with other individuals, such as a telephony and/or videoconferencing session; and/or a set of writings by the individual 612, such as a set of news articles authored by a news reporter. Moreover, the message provider 408 may already store the expression set 602 of the individual 612 (e.g., a set of messages sent by the individual 612 to the recipient 512, and/or a set of messages received by the user 112 from the individual 612), and/or may have access to an expression set 602 stored elsewhere (e.g., a collection of statements made by a celebrity, or a set of quotes from a character in a work of fiction).

As a third variation of this first aspect, the expression style 606 may be extracted from the expressions 604 of the expression set 602 in a variety of ways.

As a first example of this third variation of this first aspect, the expression style 606 may further comprise a phrase that appears in the expressions 604 of the expression set 602 with a phrase frequency that exceeds a phrase frequency threshold (e.g., more than five instances of a phrase or variant thereof throughout the expression set 602, and/or a phrase appearing in at least 10% of expressions 604 by the individual 612 in the context of a particular statement 502). Alternatively or additionally, the expression style 606 may involve a particular type of content that the user individual 612 includes and/or references in such expressions 604; e.g., the individual 612 may frequently send pictures of cats in messages 406 to other individuals.

As a second example of this third variation of this first aspect, the expression style may further comprise a tone of the expressions 604 authored by the individual 612. The tone may comprise, e.g., the tone exhibited by the individual 612 while conveying a particular type of statement 502 (e.g., whether the individual 612 typically expresses "happy birthday" messages in a genuine, formal, religious, and/or sardonic tone), and/or the tone exhibited by the individual 612 while conversing particularly with the recipient 512 (e.g., whether the relationship between the individual 612 and the recipient 512 exhibits a formal, familial, romantic, and/or teasing tone).

As a third example of this third variation of this first aspect, a statement 502 may be associated with a statement context, such as an event that is associated with the statement 502. For example, the user 112 may wish to express a statement 502 such as "thank you," but depending on the context of the statement 502, the user 112 may prefer a formal tone, a familial tone, or a romantic tone. One technique for utilizing the expression context involves mapping the respective expressions 604 in the expression set 602 with an expression context, such as the type of event (e.g., by examining only the expressions 604 of the expression set 602 that have an expression context matching the statement context) to identify the expression style 604 of the individual 612 when composing expressions 604 of statements 502 in a similar statement context. For example, where some expressions 604 are associated with instances of an event (e.g., expressions 604 that the individual 612 expresses to others during a particular holiday), a message provider 408 may fulfill a request to compose an expression 604 for the user 112 in a subsequent instance of the same event in view of the expression styles 606 used in the preceding expressions 604 having a similar expression context.

As a fourth variation of this first aspect, respective expressions 604 in the expression set 602 may be respectively associated with an expression recipient, such as the person to whom the expression 604 was directed; in whose presence the expression 604 was expressed; and/or to whom the expression 604 relates. Accordingly, responsive to the user 112 requesting the composition of a message 406 expressing a statement 502 to a particular recipient 502, the message provider 408 may identify examine only the expressions 602 that are associated with the expression recipient matching the recipient 512 of the statement 502, in order to identify an expression style 606 that the individual 612 frequently utilizes for expressions 604 associated with the recipient 512.

Figures 10, 11:
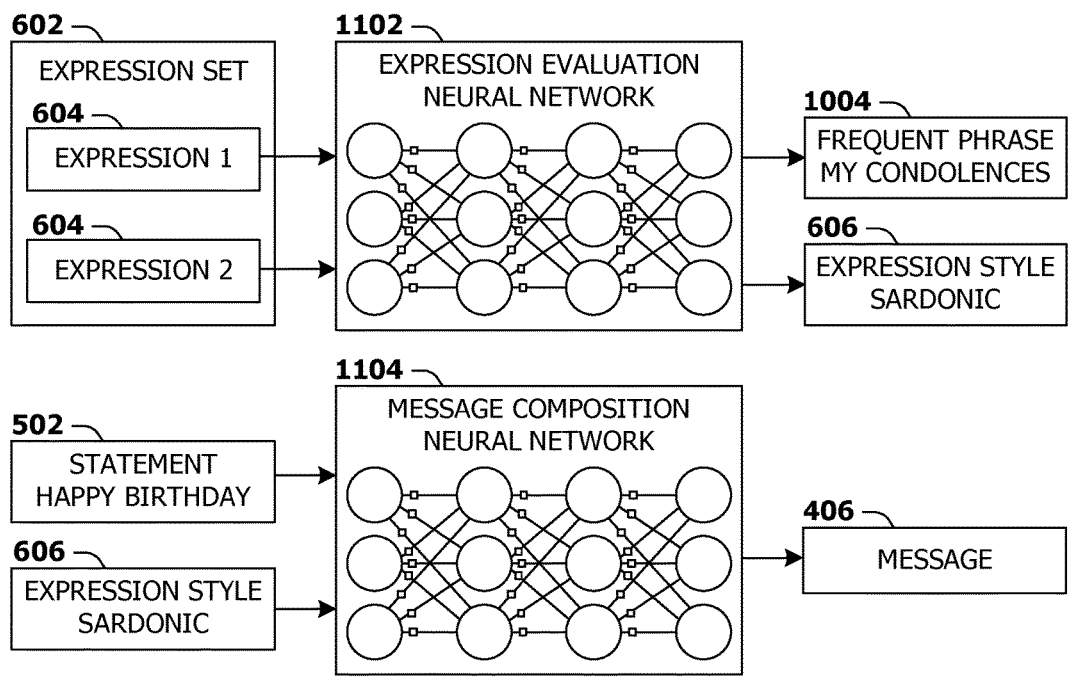
FIG. 10 is an illustration of a scenario featuring an example expression set of expressions composed by an individual that may be evaluated to determine the expression styles of the individual in accordance with the techniques presented herein.
FIG. 11 is an illustration of a scenario featuring the use of adaptive algorithms to identify the expression styles of the expressions of an individual, and to generate a message therefrom, in accordance with the techniques presented herein.

FIG. 10 presents an illustration of a scenario 1000 featuring several such variations in the identification of expression styles 606 in accordance with the techniques presented herein. In this scenario 1000, an expression set 602 includes expressions 604 that exhibit a variety of expression styles 606 that may be utilized by an individual 612 in a variety of contexts. As a first such example, during various events 1002 (such as a birthday, a lunch meeting, and an illness of a friend), the expressions 604 used by the individual 612 as the expressions 604 of statements 502 may exhibit a variety of frequently used phrases 1004 (e.g., a first phrase 1004 that the individual 612 uses to express a "happy birthday" statement 502; a second phrase 1004 that the individual 612 uses to express a "let's have lunch together" statement 502; and a third phrase 1004 that the individual 612 uses to express a "get well soon" statement 502). As a second such example, the individual 612 may utilize an expression style 606 that includes and/or references various forms of content in such expressions 604, such as the use of movie quotes to express a "happy birthday" statement 502. As a third such example, the individual 612 may utilize various tones in the expressions 604 of such statements 502, such as a casual tone when communicating about a lunch meeting, and a formal tone when expressing a "get well soon" statement. As a fourth such example, the individual 612 may utilize different expression styles 606 when communicating with various recipients 512, such as a religious expression style 606 when communicating with a grandmother, a casual expression style 606 when communicating with a colleague, and a sardonic expression style 606 when communicating with a friend. These and other variations in the types of expression styles 606 utilized in various expressions 606 of respective statements 502 may be identified in accordance with the techniques presented herein.

As a fifth variation of this first aspect, many techniques may be utilized by the message provider 408 identifies the expression styles 606 from the expressions 604 of the expression set 602.

As a first example of this fifth variation of this first aspect, the expression set 602 may be preprocessed to identify the expression styles 606 of the individual 612 in order to facilitate a later request by the user 112 to compose a message 406 expressing a statement 502 in the expression style 606 of the individual 612. For example, at a first time, responsive to receiving a selected expression from an individual 612, the message provider 408 may evaluate the selected expression 604 to identify an expression style 606 of the individual 612, and may store the expression style 606; and at a second time that is after the first time, the message provider 408 may retrieve the expression style 606 of the individual 612 to compose the message 406. Alternatively, the message provider 408 may evaluate the expression set 602 in an ad hoc manner, e.g., responsive to receiving the request from the user 112 to generate such a message 406.

As a second example of this fifth variation of this first aspect, the identification of the expression styles 606 of respective expressions 604 may be achieved by an adaptive algorithm that is configured to, for respective expressions 604, identify the expression style 606 of the expression 604. For example, a neural network or Bayesian classifier may be devised that calculates the expression style 606 of the respective expressions 604, based on either a supervised or an unsupervised learning model. The expression style 606 of a received expression 604 may thereafter be identified simply by invoking the adaptive algorithm. Alternatively, a developer may provide a set of rules or heuristics for determining the expression style 606, such as the frequency of association of respective keywords and/or key phrases with respective expression styles 606. Such adaptive algorithms may also be utilized for other aspects of the techniques presented herein, including the composition of messages 406 that express statements 502 by incorporating various forms of expression styles 606.

FIG. 11 is an illustration of a scenario 1100 featuring various forms of adaptive algorithms in various aspects of the techniques presented herein. Such adaptive algorithms may be generated, e.g., through an unsupervised or supervised training process. In this scenario 1100, an expression set 602 featuring a variety of expressions 604 is provided to an expression evaluation neural network 1102, which may identify phrases 1004 that frequently appear in such expressions 604 and/or an expression style 606 of such expressions 604. For example, a service that is adapted to evaluate a content item (such as a news article) in order to identify the subjects, relationships, statements 502, frequently arising expressions 604 including phrases and/or content that is utilized and/or referenced therein, and/or tone of the expressions 604 may be applicable to the expressions 604 of an expression set 602 in order to identify the expression styles 606 of the individual 612 expressing such expressions 604. Additionally, a message composition neural network 1104 may be provided to compose a message 406 that expresses a statement 502 in a particular expression style 606, optionally utilizing the output of the expression evaluation neural network 1102. In this manner, adaptive algorithms such as neural networks may be provided and utilized in order to fulfill various aspects of the techniques presented herein.

5.2. Composing Messages

A second aspect that may vary among embodiments of the techniques presented herein involves the manner of composing a message 406 that expresses a statement 502 in an expression style 606 of an individual 612.

As a first variation of this second aspect, a message provider 408 may store a message template set, comprising at least one message template that is respectively associated with an expression style 606. The message provider 408 may fulfill a request to compose a message 406 expressing a statement 502 by selecting, a message template from the message template set that is associated with the expression style 606 of the individual 612, and composing the message 406 using the selected message template.

As a second variation of this second aspect, a message provider 408 may store at least two expression sets 602 that respectively comprise, for respective individuals 612, at least one expression 604 expressed by the individual 612. If the user 112 selects a particular individual 612 in whose expression style 606 a statement 502 is to be expressed, the message provider 408 may retrieve an expression 604 from the expression set 602 of the selected individual 612, and may use such an expression 604 in the composition of the message 406.

As a third variation of this second aspect, the statement 502 requested by the user 112 may be associated with a content item, such as a phrase, an image, a video, or a sound recording. Accordingly, a message provider 408 may compose the message 406 expressing the statement 502 by identifying a selected content item that is associated with the statement 502, and composing a message 406 that includes and/or references the selected content item. For example, the user 112 may request to include in the message 406 an image of the user 112 and the recipient 512 together, and the message provider 408 may search for and retrieve such an image (e.g., from the photo albums of the user 112, the recipient 512, and/or other individuals 612 in a social network) and automatically attach and/or reference the image in the message 406.

FIG. 12 presents a scenario 1200 illustrating several such variations of this second aspect, wherein a message provider 408 stores a message template set 1202, comprising at least one message template 1206 that is associated with an expression style 606 of at least one individual 612. In order to fulfill a request to express a statement 502 in the expression style 606 of a particular individual 612 (e.g., in order to express a statement 502 regarding a particular event 1204), the message provider 408 may identify the expression style 606 of the individual 612, and may select message templates 1206 from the message template set 1202 in order to compose the message 406 in the expression style 602. Some message templates 1206 may include one or more slots 1208 that allow the insertion of content to adapt the message template 1206 to the statement 502 requested by the user 112, such as the name of the recipient 512. Accordingly, the message provider 408 may compose the message 406 by selecting, from the message template set 1202, a selected message template 1206 that us associated with the expression style 606 of the individual 612, and composing the message 406 using the selected message template 1206 in accordance with the techniques presented herein.

5.3. User Interface

A third aspect that may vary among embodiments of the techniques presented herein involves the user interface that enables users 112 to request the composition of messages 508 expressing various statements 502 to a recipient 512 in the expression style 606 of an individual 612.

As a first variation of this third aspect, the message provider 408 may be invokable by the user 112 to assist in the composition of messages 508. For example, responsive to receiving a request from the user 112 to compose a message 406 expressing a statement 502, the message provider 408 may compose a message 406 expressing the statement 502 in the expression style 606 of the individual 612.

As a second variation of this third aspect, the statement 502 may be associated with an event 1204 involving the recipient 512. Responsive to detecting the event 1204 involving the recipient 512, a message provider 408 may present to the user 112 an offer to generate a message 406 expressing a statement 502 about the event 1204 to the recipient 512 (e.g., a "happy birthday" message during an instance of the recipient's birthday); and responsive to receiving an acceptance of the offer from the user 112, the message provider 408 may compose the message 406 expressing the statement 502 in the expression style 606 of the individual 612.

As a third variation of this third aspect, an opportunity to present a message 406 to a recipient 512 may be detected from an interaction between the user 112 and the recipient 512. Accordingly, the message provider 408 may monitor the interaction between the user 112 and the recipient 512 to detect a statement opportunity, and may, responsive to detecting the statement opportunity, present to the user 112 an offer to compose a message 406 expressing a statement 502 associated with the statement opportunity. For example, if the recipient 512 indicates that he or she is experiencing an unpleasant health condition, the message provider 408 may suggest that the user 112 compose a "get well soon" message 406 to the recipient 512, and may offer to facilitate the composition of the message 406 in the expression style 606 of an individual 612.

As a fourth variation of this third aspect, the message provider 408 may permit the user 112 to indicate various properties of the message 406 to be composed that expresses the statement 502 to the recipient 512. As a first such example, responsive to receiving from the user 112 a topic to be referenced in the message 406, the message provider 408 may composing a message 406 that references the topic while also expressing the statement 502 in the expression style 606 of the individual 612. For example, if the expression style 606 of the individual 612 includes quotes from literature, and if the user 112 requests a message 406 expressing a statement about a particular holiday and also referencing the recipient's cat, the message provider 408 may compose a message 406 that includes a quote from literature involving both the holiday and a cat (e.g., including the Charles Dickens quote: "what greater gift than the love of a cat?")

As a fifth variation of this third aspect, upon composing a message 406, the message provider 408 may present the message 406 to the user 112 for confirmation prior to sending the message 406 to the recipient 512. If the user 112 requests an adjustment of the message 406, the message provider 508 may receive and apply the adjustment to the message 406. Additionally, if the user 112 requests that the message provider 408 to generate a second message 406 from the expression set 602, the message provider 508 may reexamine the expression set 602 to identify a second expression style 606 of the individual 612, and compose a second message 406 expressing the statement 602 in the second expression style 606 of the individual 612. For example, if the message provider 408 utilizes an adaptive algorithm that composes messages 508 according to a composition property, the message provider 408 may adjust the composition property of the adaptive algorithm in order to generate a second message 406 that may be closer to the intent of the user 112.

FIG. 13 presents an illustration of a scenario 1300 featuring an example technique for composing messages 406 from an expression set 602 as requested by a user 112. In this scenario 1300, a detected instance 1302 of an event 1204 may prompt a message provider 408 to send to a user 112 a suggestion 1304 to send a message 406 to a recipient 512, such as an expression of a "happy birthday" statement 502 upon detecting an imminent instance of the recipient's birthday. Alternatively, the user 112 may submit to the message provider 408 a request 1306 to generate a message 406 expressing a statement 502. In either case, the message provider 408 may invoke a message composition neural network 1104 that is able to utilize a message property 1308

(such as a short message length) in combination with an expression style 606 to generate a first message 406. If the user 112 is not satisfied with the first message 406 and requests a second message 406, the message composition neural network 1104 may compose a second message 406 expressing the statement 502, optionally by reevaluating the expression set 602, and/or utilizing a different expression style 606 and/or message property 1308 as requested by the user 112 (e.g., fulfilling a request to generate a "shorter" message 406, or a message 406 with a more formal tone). The message composition neural network 1104 may continue to generate messages 406 that express the statement 502 in the expression style 606 of the selected individual 612 until the user 112 is satisfied with a composed message 406, at which time the message provider 408 may transmit the message 406 to the recipient 512. Many such techniques may be utilized for interacting with the user 112 through a user interface to achieve the composition of messages 406 expressing statements 502 to recipients 512 in accordance with the techniques presented herein.

6. Usage of Terms

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A method of expressing a statement to a recipient on behalf of a user on a device having a processor, the method comprising:
   executing on the processor instructions that cause the device to:
      examine an expression set comprising at least one expression authored by the user to identify a phrase that appears in at least one prior expression previously authored by the user and that is relevant to the statement;

compose a message expressing the statement in an expression style of the user by:
selecting a message template associated with the expression style of the user, wherein the message template comprises at least one slot for insertion of content to adapt the message template to the statement; and
inserting the phrase previously authored by the user into the at least one message slot of the message template;
present the message to the user for confirmation; and
responsive to receiving a confirmation of the message from the user, transmit the message to the recipient, transmit the message to the recipient.

2. The method of claim 1, wherein:
the statement is associated with a statement context;
respective expressions in the expression set are associated with an expression context; and
identifying the phrase further comprises: examining only the at least one expression having an expression context matching the statement context.

3. The method of claim 2, wherein:
the expression context further comprises respective instances of an event that is associated with the expression; and
the statement context further comprises an instance of the event.

4. The method of claim 1, wherein:
the device further comprises an adaptive algorithm that, for respective expressions, identifies an expression style of the expression; and
executing the instructions further causes the device to invoke the adaptive algorithm to identify the expression style of the at least one expression authored by the user.

5. The method of claim 4, wherein:
the adaptive algorithm further composes the message using a composition property; and
executing the instructions further causes the device to, responsive to receiving from the user an adjustment of the composition property:
adjust the composition property of the adaptive algorithm according to the adjustment requested by the user;
invoke the adaptive algorithm to compose a second message according to the composition property;
present the second message to the user for confirmation; and
responsive to receiving a confirmation of the second message from the user, transmit the second message to the recipient.

6. The method of claim 1, wherein identifying the phrase further comprises: identifying a phrase that appears in the at least one expression of the expression set previously authored by the user with a phrase frequency exceeding a phrase frequency threshold.

7. The method of claim 1, wherein the expression style further comprises a tone of the at least one expression authored by the user.

8. The method of claim 1, wherein:
respective expressions in the expression set are associated with an expression recipient; and
identifying the phrase further comprises: examining only the at least one expression associated with an expression recipient matching the recipient of the statement.

9. The method of claim 1, further comprising:
receiving, from the user, a description of a content item to be included in the message;
searching a data set to identify a selected content item that matches the description; and
including the selected content item in the message.

10. The method of claim 1, wherein:
the expression set is of a message type of messages sent by the user, wherein the message type is selected from a message type set comprising:
email messages;
simple message service (SMS) messages;
media message service (MMS) messages;
chat messages; and
voice-based messages.

11. The method of claim 1, wherein selecting the phrase previously authored by the user further comprises: selecting the phrase previously authored by the user in a previous message directed by the user to the recipient.

12. A nontransitory memory device storing instructions that, when executed on a processor of a server, cause the server to express a statement to a recipient on behalf of a user, by:
examining an expression set comprising at least one expression authored by the user to identify a phrase that appears in at least one prior expression previously authored by the user and that is relevant to the statement;
composing a message expressing the statement in the expression style of the user by:
selecting a message template associated with the expression style of the user, wherein the message template comprises at least one slot for insertion of content to adapt the message template to the statement; and
inserting the phrase previously authored by the user into the at least one message slot of the message template;
presenting the message to the user for confirmation; and
responsive to receiving a confirmation of the message from the user, transmitting the message to the recipient.

13. The nontransitory memory device of claim 12, wherein:
the statement is associated with an event involving the recipient; and
executing the instructions further causes the server to:
responsive to detecting the event involving the recipient, present to the user an offer to generate a message expressing a statement about the event to the recipient; and
responsive to receiving an acceptance of the offer from the user, compose the message expressing the statement in the expression style of the user.

14. The nontransitory memory device of claim 12, wherein composing the message further comprises:
monitoring an interaction between the user and the recipient to detect a statement opportunity; and
responsive to detecting the statement opportunity, present to the user an offer to compose a message expressing to the recipient a statement associated with the statement opportunity.

15. The nontransitory memory device of claim 12, wherein executing the instructions further causes the server to, responsive to receiving a request from the user to generate a second expression:
reexamine the expression set to identify a phrase previously authored by the user; and
compose a second message expressing the statement incorporating the second phrase of the user.

16. The nontransitory memory device of claim 12, wherein executing the instructions further causes the server to, responsive to receiving from the user a request to adjust the message, adjust the message in accordance with the request.

17. The nontransitory memory device of claim 12, wherein executing the instructions further causes the server to:
receive from the user a request to alter the message according to a message property selected from a message property set comprising:
a length of the message, and
a tone of the message; and
generate an altered message according to the message property selected by the user.

18. A server that sends a message expressing a statement on behalf of a user, the server comprising:
a processor; and
a memory storing:
an expression set comprising at least one expression authored by the user; and
instructions that, when executed by the processor, provide:
an expression style identifier that examines the expression set to identify a phrase that appears in at least one prior expression previously authored by the user and that is relevant to the statement; and
a message composer that:
composes a message expressing the statement in an expression style of the user by:
selecting a message template associated with the expression style of the user, wherein the message template comprises at least one slot for insertion of content to adapt the message template to the statement; and
inserting the phrase previously authored by the user into the at least one message slot of the message template;
presents the message to the user for confirmation; and
responsive to receiving a confirmation of the message from the user, transmits the message to the recipient.

19. The server of claim 18, wherein:
the statement is associated with a content item; and
the message composer composes the message expressing the statement by:
identifying a selected content item that is associated with the statement; and
composing the message including the selected content item in the message.

20. The server of claim 18, wherein identifying the phrase further comprises: identifying a phrase that appears in at least one prior expression authored by the user and that relates to the selected content item included in the message.

* * * * *